United States Patent [19]

Shepherd

[11] 4,096,942

[45] Jun. 27, 1978

[54] ROLLER TYPE OF CONVEYOR

[76] Inventor: Thomas Paul Shepherd, S45W22061 Tansdale Rd., Waukesha, Wis. 53186

[21] Appl. No.: 728,559

[22] Filed: Oct. 1, 1976

[51] Int. Cl.² .............................................. B65G 13/07
[52] U.S. Cl. ..................................... 198/781; 198/787; 198/790; 198/857
[58] Field of Search ............... 198/781, 783, 787, 789, 198/790, 855, 856, 857

[56] References Cited

U.S. PATENT DOCUMENTS

| | | | |
|---|---|---|---|
| 1,483,971 | 2/1924 | Grossman | 193/35 A |
| 1,959,157 | 5/1934 | Eggleston | 198/787 |
| 2,129,510 | 9/1938 | Taylor | 198/787 |
| 2,194,219 | 3/1940 | Eggleston | 198/789 |
| 3,323,636 | 6/1967 | Gotham | 198/790 |
| 3,563,365 | 2/1971 | Loberg | 198/781 X |
| 3,610,406 | 10/1971 | Fleischauer et al. | 193/35 A X |
| 3,612,247 | 10/1971 | Pipp | 198/781 |
| 3,724,642 | 4/1973 | De Good | 198/781 |
| 3,756,376 | 9/1973 | Kürger et al. | 198/783 |
| 4,006,815 | 2/1977 | Werntz | 198/781 |
| 4,006,816 | 2/1977 | Werntz | 198/781 |

*Primary Examiner*—Evon C. Blunk
*Assistant Examiner*—James L. Rowland
*Attorney, Agent, or Firm*—Arthur J. Hansmann

[57] ABSTRACT

A roller type of conveyor including a support and a plurality of rollers rotatably mounted on the support for moving items therealong. A slip pulley is piloted on and rotatable relative to the rollers, and a drive mechanism and a drive belt are operative relative to the slip pulley for rotating the rollers up to a desired point of resistance by the rollers, to thus provide an accumulating type of conveyor. Tension members are in contact with the drive belt for adjusting the drive pressure and thus the accumulation feature of the rollers, and a brake is also operative on the rollers for interrupting rotation and it is under the control of mechanism and sensors, all being related to the item accumulation feature.

15 Claims, 9 Drawing Figures

ROLLER TYPE OF CONVEYOR

This invention relates to a roller type of conveyor, and, more particularly, it relates to a powered conveyor with elements for accumulating items in a static position on the conveyor, all as desired in an industrial installation for a conveyor.

BACKGROUND OF THE INVENTION

The prior art is already aware of various structures of conveyors, including the accumulating type of conveyor where the items moved on the conveyor can be retained in a static position, even though the conveyor is still actually operating. Examples of industrial types of conveyors, including those employing powered or live rollers, are shown in U.S. Pat. Nos. 2,602,536 and 3,232,415 and 3,567,010 and 3,782,515. In the accumulating type of conveyor, it is desired that the conveyor continue to operate even though the items supported on the conveyor are not being moved and are actually standing in a static condition on the conveyor, and thus the drive to the conveyor moving parts is ineffective for the purpose of moving the items, such as shown in U.S. Pat. No. 3,650,375. In that patent, a slip type of pulley is arranged on a drive shaft, and the slip pulley and the rollers are individually drivingly connected by means of a belt, such that when the items accumulate on the driven rollers, the slip pulley will stop rotating because the resistance of the items on the rollers will cause the slip pulley to become static even though the drive shaft engaging the slip pulley is still rotating. Another example of prior art slip torque or accumulating feature type of conveyor is found in the conveyors manufactured by the Shuttleworth Company of Huntington, Ind. where the conveyor-supporting rollers consist of a roller shaft and a series of rollers rotatable thereon and driven by the shaft when the shaft itself is rotated, but the rollers can stop rotation when the items are accumulated and the shaft itself will continue to rotate. In that arrangement, the shaft is driven by a pulley thereon and a belt trained over the pulley and being driven by an elongated drive shaft, and a plurality of drive belts extend between the drive shaft and the roller pulleys.

The present invention provides an accumulating type of conveyor which is simplified, reliable, easily operated and maintained, and is versatile in the conveyance of items which can be accumulated along the conveyor while the conveyor is still operating. As such, the present invention is an improvement over the conveyors of the prior art.

Still further, the present invention provides a conveyor which accomplishes the aforementioned and which does so with a conveyor drive arrangement which can be adjusted so that the drive force for the purpose of the accumulating feature can be readily and easily selectively set within the conveyor. As such, the present invention provides an adjustment for setting the tension in the drive belt.

Still further, the present invention provides a roller type of conveyor which accomplishes the aforementioned objectives and advantages and which is arranged so that it can be readily utilized in either a straight length of the conveyor or in a curved path of a conveyor.

Still further, the present invention provides a roller type of conveyor which can be easily maintained and which can be easily cleaned, and in fact can be cleaned by simply a hosing of the conveyor parts themselves.

Still further, the present invention provides a roller type of conveyor which has an arrangement for the accumulation of items, as mentioned above, and which also has an arrangement for stopping or braking the rotation of the supporting rollers themselves so that the items can be selectively accumulated or stopped in their movement. Still further, the conveyor of this invention has a sensor-type mechanism for detecting when the items are accumulating or are stopped, and the mechanism is then interconnected with a brake for the rollers for holding the rollers against driving rotation and to thereby enhance the accumulating function and to do so in a positive manner.

With more direct reference to the structural elements embodying this invention, the conveyor of this invention is arranged that either a straight path or a curved path of a live roller accumulating type of conveyor utilizing power from a continuous drive mechanism to a conventional conveyor roller, and with the drive going through a slip collar on the roller. Also, an adjustable tensioning device is operative on the drive media, such as a drive belt, and thus the drive force to the roller can vary from zero to a maximum, depending upon the tensioning adjustment. As such, under one mode of functioning, the items supported on the conveyor will be driven by the rollers and the slip collar will be rotating in unison with the rollers. If the conveyed items should stop for any reason, the rollers will stop and the slip collar will simply continue to turn and the drive media and mechanism will continue to function also. Additionally, a sensor can be utilized to detect the static condition of the items on the conveyor, and the sensor can control the movement of a brake which will hold the rollers against rotation, as desired.

Accordingly, the features and advantages of this invention include the following:
1. Arrangement of a straight line or curved type of conveyor utilizing a continuous drive media to empower a slip collar on the conveyor roller.
2. The drive media can continue to operate without adverse wear or friction to the drive media even while the conveyor roller is in a static state.
3. Adjustable torque control through the drive media to the slip collar and to the roller itself, all through a tensioning device which can be adjusted to any desired tension and which is alternating in pairs of rollers along the conveyor.
4. Capability of using a standard gravity type conveyor and convert it to a powered live roller transporting and accumulating type of conveyor, with minimum modification and alteration in operation.
5. The tolerances of the collar size to the roller size may vary greatly without adverse functional results, and even the wear between these parts will not require replacement or maintenance of the parts and the functional characteristics will remain almost the same; and this "no tolerance" feature permits use of commercial rollers to normal economical tolerances.
6. The drive arrangement is such that urethane belting can be utilized as the drive media, and this eliminates the need of special take-up mechanisms commonly used to compensate for stretching of belts of other types.
7. Utilization of roller braking mechanism at various locations along the conveyor for accumulating items thereon in zones along the conveyor. With this arrangement, when a zone downstream on the conveyor has the items static thereon, then there is operation of the brake mechanism in that zone and in the zone adjacent thereto and in all subsequent zones, all so that the items will not be forced against each other along the length of the conveyor, and thus the items are protected from such force therebetween, and this is particularly significant when the items are fragile.

Other objects and advantages will become apparent upon reading the following description in light of the accompanying drawings:

BRIEF DESCRIPTION OF THE DRAWINGS

FIGS. 6 and 7 are side elevational views of fragments of the conveyor of FIG. 1, and with the brake mechanism added thereto.

DETAILED DESCRIPTION OF THE PREFERRED EMBODIMENT

Figure 3:
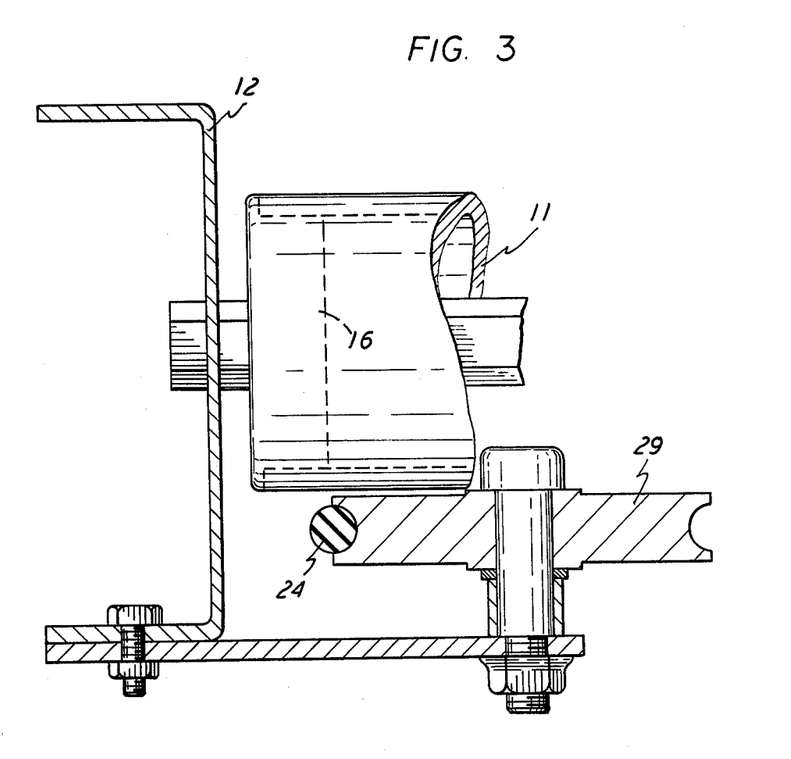
FIGS. 3, 4, and 5 are enlarged sectional views taken along the respectively numbered lines of FIG. 1.

The drawings show the conveyor of this invention which includes a support, generally designated 10, and a plurality of rollers 11 rotatably supported on the support which is further shown to include two spaced-apart channels 12. The rollers 11 extend between the channels 12, and the rollers are shown to consist of tubular sections 13 and a hexagonally-shaped shaft 14 extending on each axial end of the member 13, and the shafts 14 nonrotatably extend into the respective conveyor channels 12. Thus, the tubes 13 of the rollers 11 are suitably rotatably mounted, and they may be supported by means of a conventional rotation bearing 16 which is directly supported by means of the roller shafts 14, in a conventional arrangement and as shown in FIG. 3, for instance. Thus the shafts 14 can extend between the spaced-apart channel members 12, and the roller tubes 13 are rotatable relative to the shafts 14, such as by means of the intervening bearings 16.

Figures 1, 2:
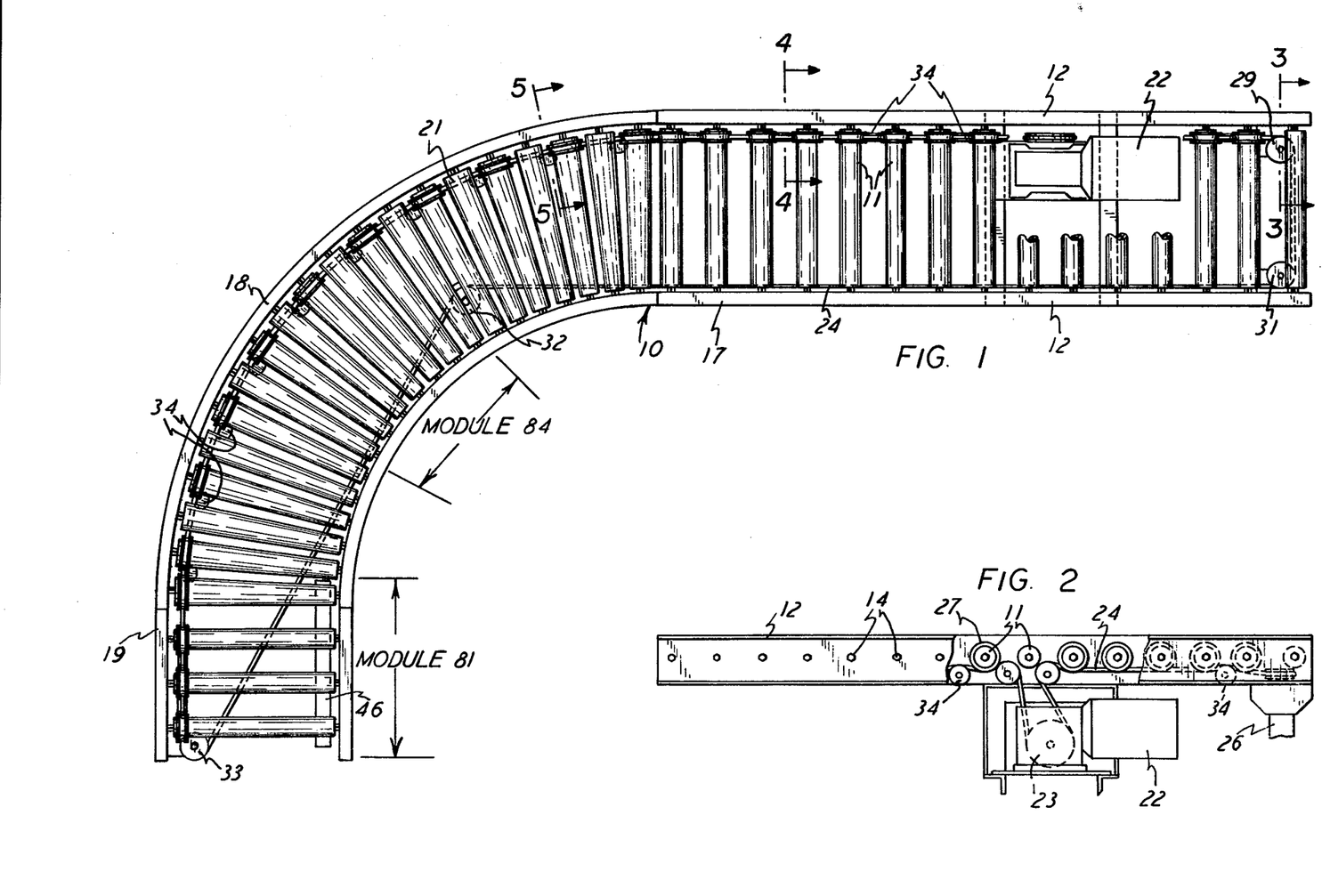
FIG. 1 is a top plan view of a conveyor having a preferred embodiment of this invention incorporated therein.
FIG. 2 is a side elevational view, with a fragment thereof broken away, of the conveyor shown in FIG. 1.
Figure 2:
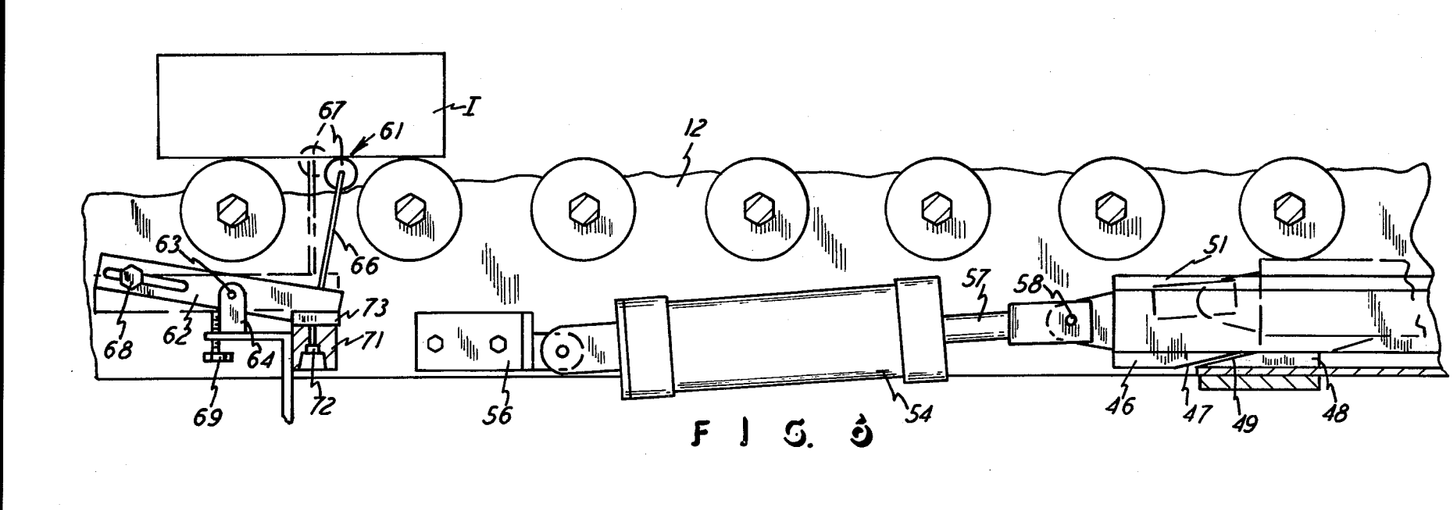

Of course it will further be seen and understood that FIG. 1 shows a conveyor linear or straight section 17 and a conveyor curved section 18 and another conveyor straight section 19. Of course items or articles to be conveyed will be disposed on the straight rollers 11 and on the tapered rolles 21 which extend through the curved section 18, as shown, and these items will be moved along the conveyor from a point of entry to a point of discharge, all as desired. Still further, the conveyor as seen in these drawings could be a gravity type conveyor such that one end of the conveyor 10 would be higher than the other end and the weight of the articles thereto, simply under the influence of gravity alone, could cause the articles to move along the conveyor as the rollers 11 and 21 rotate under the force of the items moving by gravity. That is, the conveyor could be a gravity type conveyor and it can be readily and easily converted to a live or powered roller conveyor, as shown in these drawings and which is the essence of this invention.

A drive mechanism 22, such as an electric or hydraulic or other motor, is shown disposed below the conveyor 10, and it has a drive pulley 23 powered by the motor 22, and a drive belt 24 is trained on the pulley 23 and extends therefrom along the length of the conveyor 10, as shown in FIGS. 1 and 2. The conveyor 10 can also then include legs or standards, such as the shown leg 26, which will support the conveyor 10 above a floor in an industrial plant or the like, and which will connect the channels 12 together. The drive mechanism 22 is accommodated below the conveyor frame or channels 12, as shown. The belt 24 is preferably of a urethane material, and it therefore has only a minimum of stretch as a physical characteristic, and this feature is utilized in effecting the drive and tensioning of the belt 24 relative to the driven rollers shown in the conveyor in FIG. 1. Thus, the rollers 11 and 21 have a belt pulley 27 coaxially disposed on the rollers in the positions as shown in FIG. 1, that is on certain of the rollers 21 and all of the rollers 11 and on one end of those rollers mentioned. The pulley 27 is in the nature of a slip pulley or collar in that it can rotate relative to the respective roller 11 and 21, depending upon the radial force acting on the pulley 27 and forcing it against the outer surface of the tubular configuration of the roller, such as the cylinder 13 of the rollers 11. As such, radial positioning of the drive media or belt 24 will create sufficient radial and drive force between the slip pulley 27 and the respective roller for rotating the roller up to a certain force of rotation therebetween. That is, the pulleys 27 are not affixed relative to the respective rollers on which they are mounted, but there is a tolerance of the fit therebetween so that the pulleys 27 can rotate relative to the exteriors or tubes of the respective rollers, but yet there can be sufficient radial pressure and thus driving torque effective therebetween, and the roller exteriors are preferably of a metal and the pulleys 27 can be of a plastic nature to have a good coefficient of friction possible therebetween. It should also be noticed and understood that the belt 24 will create the desired radial force against the pulleys 27 and in turn have the pulleys in driving relation with the rollers 11 and 21, and the belt 24 will also actually retain the pulleys 27 in their end positions relative to the respective rollers. That is, the belt 24 is tautly trained in the grooves 28 of the respective pulleys 27, and the belt 24 is also trained on pulleys 29, 31, 32, and 33 which guide the continuous loop of the single belt 24 required for this drive arrangement of the entire length of the conveyor as seen in FIG. 1. With this arrangement, the single drive belt 24 and the single drive arrangement can be utilized for both the conveyor straight sections 17 and 19 and for the curved section 18, and no complicated or separate or unique drive arrangements or accommodations need be made, especially for the curved section 18.

Figure 4:
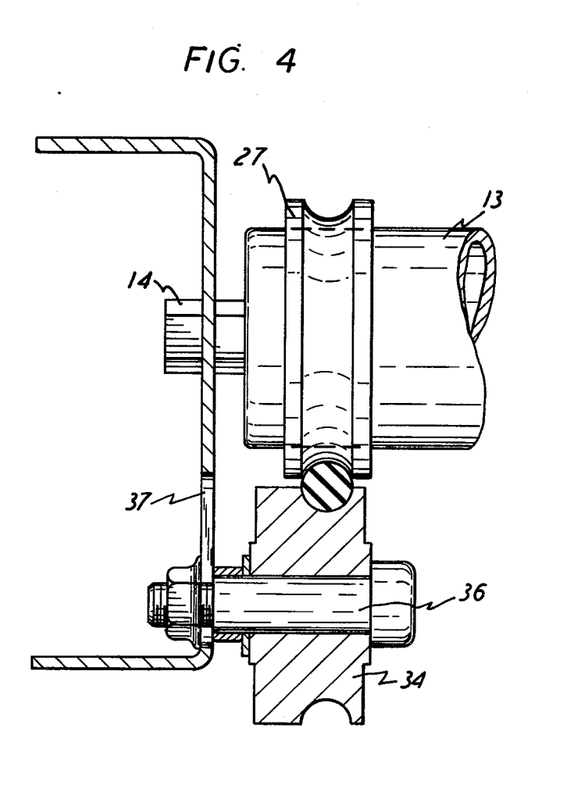
Figure 5:
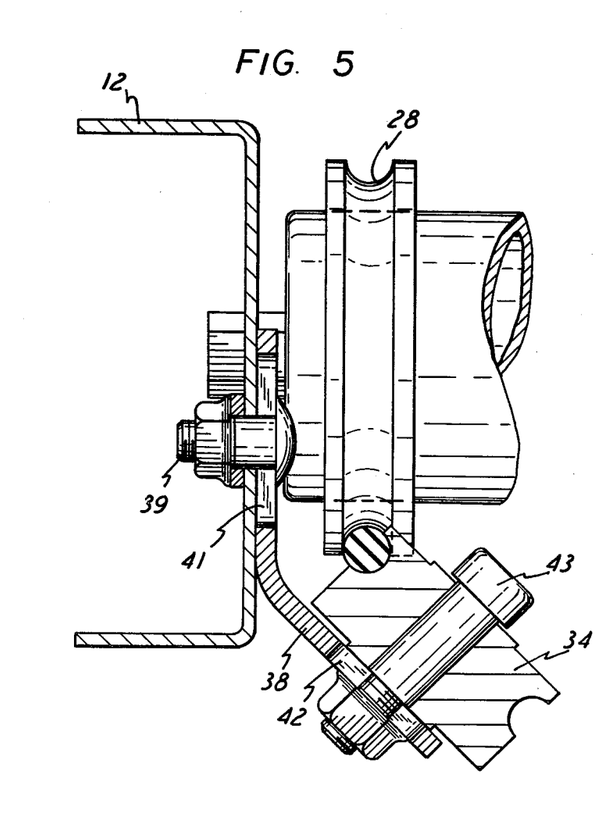

In order to adjust and assure that there be desired tension in the belt 24, adjusting type of idler pulleys 34 are located adjacent the pulleys 27 and in line with the belt 24 which is therefore trained on the pulleys 34, such as shown in FIGS. 1 through 5. Thus, the adjusting and idler pulleys 34 are suitably mounted on the conveyor support and they have a mounting shaft or bolt 36 which is movable toward and away from the extent of the belt 24, all to thereby create tension in the belt 24 and to urge the belt 24 relative to the driving collars 27 and to thereby control the radial force between the collars 27 and the respective rollers 11 and 21, as mentioned above. Thus, the tensioning pulleys 34 are located intermediate the pulleys or slip collars 27, and adjusting slots 37 receive the respective shafts or bolts 36 so that the pulleys 34 can be moved toward and away from the belt 24 in the selective adjusting process mentioned. Thus, FIG. 4 shows an adjusting pulley 34 disposed in the same alignment as the pulley 27, and this is the arrangement on the straight extents 17 and 19 of the conveyor 10. FIG. 5 shows the adjusting pulley 34 at an angle relative to the pulley 27, and this is the arrangement on the curved portion 18 of the conveyor 10. Thus, a mounting bracket 38 is secured to the suppport channel 12 by means of a bolt 39 extending through an adjusting slot 41 in the bracket 38. Also, an adjusting slot 42 is shown at the other end of the bracket 38, and the pulley bolt 43 can slide in the slot 42, and therefore there could be two slots 41 and 42 for adjustment of the pulley 34 relative to the pulley 27 on the conveyor curved portion 18. The angulation for the pulley 34 on the curved portion 18 assures that the belt 24 will remain in the pulley groove 28, and thus the single drive belt 24 can be utilized for the conveyor curved portion 18.

FIG. 3 shows the arrangement for the turnaround pulley 29 which is shown in the horizontal orientation in FIGS. 1, 2, and 3, and the same arrangement would be true for the pulleys 31, 32, and 33.

With the conveyor arrangement as described to this extent, it will therefore be seen and understood by anyone skilled in the art that items can be placed on one end of the conveyor 10 and they will be moved to the other end of the conveyor 10, and such movement is induced by the motor 22 driving the belt 24 which in turn rotates the pulleys 27 which are in frictional drive with the respective rollers mentioned. However, if the items are blocked in their movement and therefore accumulate on the conveyor 10, then the rollers 11 and 21 will be resisted in their rotation and thus the collars 27 will simply slip on the respective rollers 11 and 21 which are being retarded in rotation. This is of course the desired effect, and there is no adverse effect to the conveyor components, but the motor 22 will simply continue to operate and the belt 24 will continue to move along with the rotation of the slip collars 27, but the respective rollers will not rotate and the items will be desirably static on the conveyor 10.

Referring now to the accumulation of the items on the conveyor 10 when there is a stoppage of movement of the items along the conveyor 10, it is customary to assume that the total weight or live load of the items on the conveyor is of a certain magnitude, say 3000 pounds, and one can reasonably assume that the buildup of force between the items when they are stopped will be approximately 2 percent of the weight of the items on the conveyor, and that would amount to 60 pounds in this example. In most instances, this force of 60 pounds of one item against the other is acceptable, however there are situations where one would not want a force between the items when they are stopped on the conveyor 10. The present invention accommodates that situation by applying a brake and a brake control system for positively stopping the rotation of the conveyor rollers.

FIGS. 6 through 9 show a braking system for accomplishing the aforementioned, and here it will be seen that there is a brake bar 46 which is slidably disposed relative to the conveyor frame, and the bar 46 has an inclined plane 47 on the lower side thereof. The conveyor frame has a fixed inclined plane 48 faced toward the plane 47, and it will thus be seen and understood that when the bar 46 is slid toward the inclined plane piece 48, then the inclined plane 49 of the piece 48 engages the plane 47 to elevate the bar 46 and bring it into contact with the rollers 11, for instance. The top of the bar 46 may be provided with a brake pad 51 which can be slightly compressible and thus assure firm holding of the rollers against rotation. The bar 46 is guided in a channel 52 which is fixedly mounted on a frame piece 53 of the conveyor frame.

A fluid cylinder assembly 54 is also mounted on the conveyor frame, such as by means of a bracket 56, and the assembly 54 has its piston rod 57 extending into pinned connection with the bar 46, by a pin 58 as seen in FIG. 6. Thus, extension and retraction of the assembly 54 will cause the longitudinal movement of the brake bar 46 for the movement of the bar between the solid line and the dot-dash line positions shown in FIGS. 6 and 7, and of course the dot-dash line position is the braking position. Of course the brake bar 46 does not extend for the length of the conveyor, but there may be several brake bars 46 along the length of the conveyor and with each brake bar 46 engaging at least several of the conveyor rollers, and it will be understood that there are several rollers within the length of the brake bar 46, as shown between FIGS. 6 and 7. Therefore, the brake system is applied in sections or zones along the conveyor 10, and this is completely adequate for the purposes needed and intended herein. That is, considering a 10 foot length of the conveyor 10 and assuming that only 2 feet of the 10 foot length are controlled by a brake bar 46, then the remaining 8 feet of the conveyor would have a load of 300 pounds thereon, then, at the 2 percent force factor, the total force between the items standing on the conveyor would be only 6 pounds in the lengths between the brake sections, and that is the maximum force at any one point and is not cumulative along the length of the conveyor.

Figure 9:
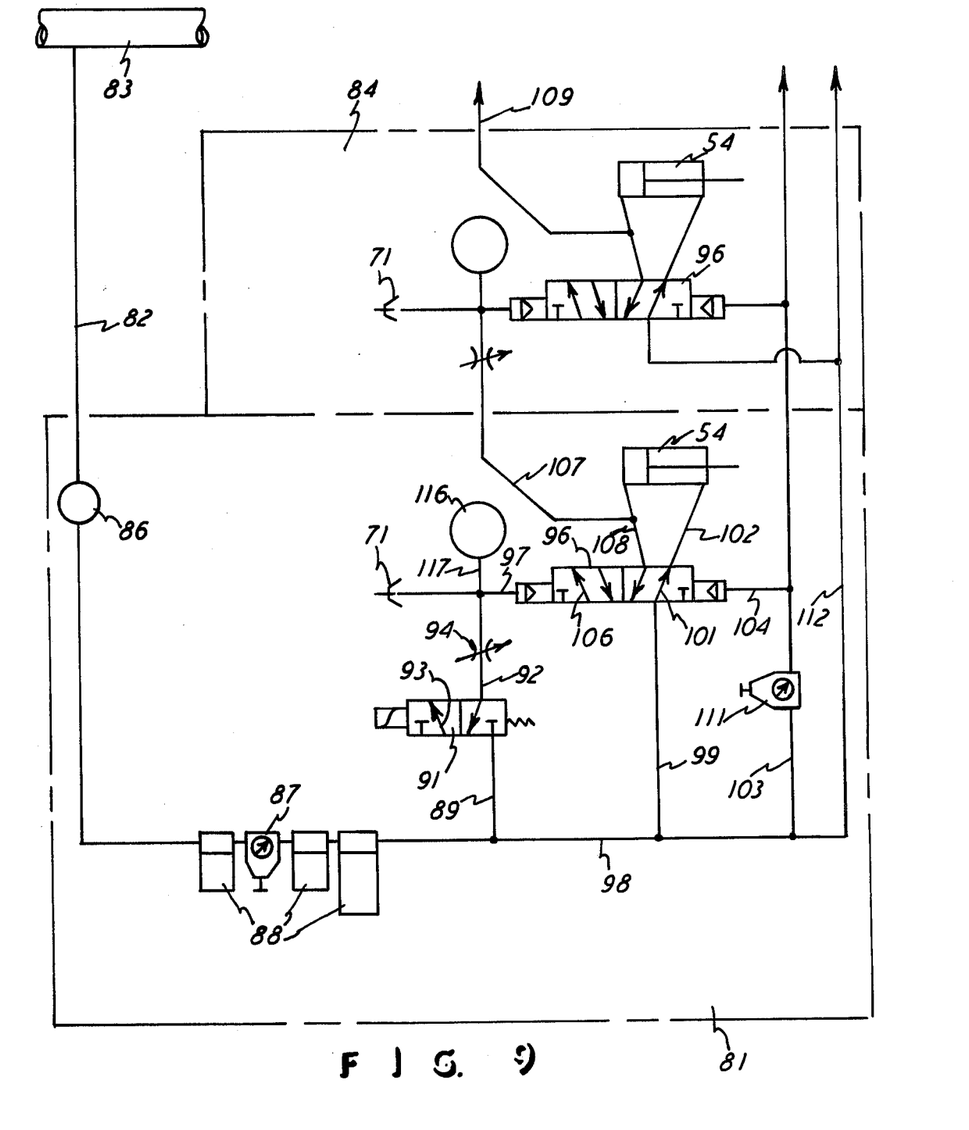
FIG. 9 is a schematic view of the conveyor accumulating sensor and brake apparatus.

This invention further includes an automatic sensor or actuator for the fluid cylinder assembly which is controlling the brake bar 46, and the left hand portion of FIG. 6 and all of FIG. 9 show this mechanism and its arrangement. Accordingly, FIG. 6 shows a sensor generally designated 61 which is sensitive to the location of the items supported by the conveyor rollers 11. The sensor 61 has a bar 62 which is pivotally mounted on a fixed pin 63 supported on a bracket 64 suitably affixed to the conveyor frame. An upstanding arm 66 carries a roller 67 on the upper end thereof, and the roller can move between the solid line and the dot-dash line position shown in FIG. 6, in accordance with the pivoting of the bar 62 about its pivot pin 63. The bar 62 has an adjustable weight 68 and there is an adjustable stop 69 which engages the bar 62 when it is in its substantially horizontal or dot-dash position shown. An air nozzle 71 is suitably affixed to the conveyor frame and has an air passageway 72 which extends upwardly through the nozzle 71 and permits air to escape up through the nozzle 71 and toward the pivot bar 62. An air valve pad 73 is affixed to the end of the bar 62 and moves into contact with the nozzle 71 to stop the flow of air through the nozzle passageway or jet 72, when the bar 62 is in its tipped or solid line position shown, and of course that would be the position at which an item would be resting on the rollers directly above the sensor 61 and with that item depressing the sensor feeler or roller 67 to the solid line position shown. The item is designated I and shows its action on the rollers 67. The arm 62 is of course counterweighted by the adjustable connector or weight 68 so that the arm 62 will go into the dot-dash position when the item I is no longer located immediately above the roller 67. At this point it will of course be appreciated that when the item I is depressing the feeler or roller 67 to close the nozzle of valve 71, then there will be an action to activate the cylinder 54 and extend the brake bar 46 into its dot-dash line or brake position. Of course there is a time delay arrangement with regard to the sensor 61 so that the mere movement of an item I across the roller 67 will not activate the brake system, but the time delay will be effective so that the system will sense when the item I is static and no longer being conveyed, and of course it is then that the brake system is actuated. It will further be understood that the sensor 67 does not actually control the shown air cylinder assembly 54, but it would control another air cylinder assembly 54 which is upstream from the location of the shown sensor 61 so that the oncoming item or articles on the conveyor would be subjected to the braking action at the location upstream from that sensor 61.

Figure 7:
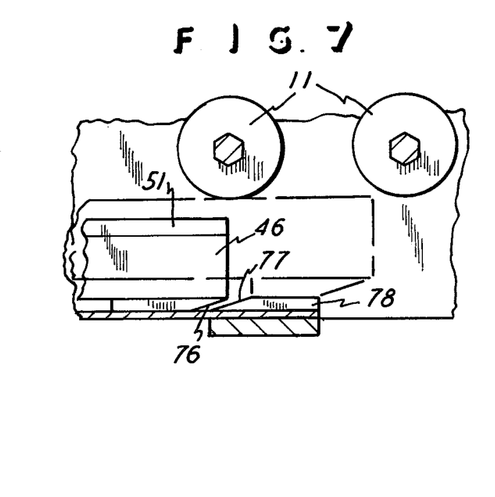
Figure 8:
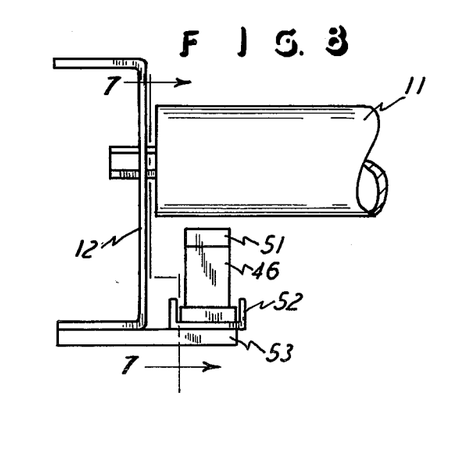
FIG. 8 is an end elevational view of the conveyor shown in FIG. 7.

Also, FIGS. 6 and 7 show the opposite ends of the brake bar 46, and, as mentioned in connection with FIG. 6, the end shown therein has an inclined surface 47 which engages the stationary inclined surface 49 for raising the brake bar 46 to the dot-dash position of FIG. 6 and that is the position where the brake pad 51 is against the rollers thereabove. FIG. 7 therefore shows the extending end of the brake bar 46, and here it will also be noted that the brake bar 46 has an inclined surface 76 which engages the inclined surface 77 on the piece 78 affixed to the conveyor frame through interconnection with the affixed channel 52 which guides the brake bar 46 along its length. Accordingly, both ends of the brake bar 46 are elevated when the respective ends engage the inclined surfaces 49 and 77, and thus the brake bar elevates to the dot-dash position and against the conveyor rollers to stop the rotation of the rollers and to hold them against rotation while the slip collar or pulley 27 continues to rotate under the driving force of the belt 24.

FIG. 9 shows the schematic for the control for operating the zones of the brake bars 46 which are spaced along the conveyor, and here it will be seen that there is shown one module 81 having an air line 82 connected to a pipe 83 which is an air pipe available in an industrial plant or the like, and thus air under pressure is presented to the one shown module 81. The drawing also shows a second module 84 which is connected with the module 81 through the air lines shown, and there could be additional modules 84 on down the line for servicing the entire length of any conveyor installation. A shutoff valve 86 is in the line 82 which also leads to a conventional air regulator 87 which can be adjusted for setting the desired air pressure, and there are also conventional air filters 88 in the line which leads to a line 89 fluid-flow connected with a solenoid valve 91, as shown. The valve 91 is a solenoid type valve and it receives an electric signal from an external source at the discharge end of the conveyor. That is, if the downstream end of the conveyor is not ready to receive the items, an electric signal is sent to the valve 91 for shifting the valve, such as in the position shown in FIG. 9. When the conveyor is ready for receiving the items and thus operating, the valve 91 will be shifted to the right so that the air line 89 will be connected with the air line 92 through the solenoid valve passageway 93, and thus air can flow through a needle valve 94 and to the jet valve 71. The valve 71 is connected to an air spool 96 through the line 97, and thus the spool 96 will shift according to the air pressure in the line 97, and that air pressure is established by the position of the closure 73 relative to the valve 71 and its air outlet jet 72, as shown in FIG. 6.

FIG. 9 also shows the air line 98 and a line 99 air-flow connected with the spool 96 and its passageway 101 which in turn connects with an air line 102 leading to the rod end of the air cylinder 54. Thus, in the FIG. 9 position, the spool 96 is set so that the cylinder assembly 54 is contracted, and thus the brake bar 46 is not being applied to the rollers of the conveyor. The drawing further shows an air line 103 connected with the line 98 and extending through a line 104 to the other side of the spool 96, and the line 103 also extends to another spool 96 located in the module 84, as shown.

When the product or items I on the conveyor 10 extend the time occupied over the sensor roller 67 to actuate the sensor 61, then the air valve 71 is closed and with some time lag the brake cylinder 54 is activated, as desired. That is, closing the valve 71 will induce the spool 96 to shift to the right, as viewed in FIG. 9, and thus the incoming air line 99 will flow-connect with the spool passageway 106 to direct the air to the head end of the cylinder 54 and thus extend the cylinder assembly 54 and actuate the brake bar 46 connected with that particular cylinder assembly 54.

Also, when the cylinder assembly 54 of a first module is actuated as just described, air pressure is then available to the second module 84, and this is through the air line 107 connected with the line 108 extending between the spool 96 and the head end of the cylinder assembly 54. A second air valve 71 is in the module 84, and if and when that second air valve 71 is closed, due to the sustained position of items over its particular sensor roller 67, then its spool valve 96 will also shift to the right and thus activate its particular cylinder assembly 54 and its particular brake bar 46, all as explained in connection with the module 81. Likewise, an air line 109 extends from the module 84 and to still another module which is not shown, but it will be understood that there could be a series of a plurality of the modules, all arranged and operating as explained with the basic components of the module 81.

FIG. 9 also shows an air pressure regulator valve 111 connected in the line 103 for controlling the pressure of the air on the one side of each of the spools 96, and an air line 112 is also shown connected with the main line 98 to permit the return flow of the air out of the individual modules and away from the respective spool valves 96, as shown and indicated and all as will be understood by anyone skilled in the art. Accordingly, FIG. 9 shows the arrangement of conventional components of air line and valves and regulators and the like arranged in the unique manner shown and for the unique purposes shown, and thus one skilled in the art will understand the arrangement and the individual components. Of course the regulator valve 111 will be set at a relatively low pressure, say 1 to 5 PSI, and that will be lower than the air pressure on the opposite side of the spools 96 when the respective valves 71 are closed, and thus there will be the shifting of the spools 96 to the right as described and as effected by the unbalance of air pressure on the respective spools 96 with the greater air pressure being on the left end of the spools 96, as viewed in FIG. 9. Further, when the valves 71 are again opened, then the air pressure on the right hand end of the spools 96 will cause the spools to shift to the left and thus to the positions shown in FIG. 9, and this will of course cause the air pressure in the respective lines 102 to retract the cylinder assemblies 54 and thus release and withdraw the brake bars 46, as desired. FIG. 1 indicates how the various modules can be spaced apart along the conveyor 10, and they can be arranged as desired, and the respective brake bars 46 will be of a length to encounter a desired number of the various conveyor rollers, as required and desired. Another feature and advantage of the application of the various brake bars 46 is that the bars move in the direction of conveyance of the items I along the conveyor, that is they move in the upstream direction and they contact the underneath surface of the various rollers, as such, they actually rotate the conveyor rollers in the direction opposite from the forward conveying direction of rotation and thereby the brake bars 46 somewhat retract the items I and thus relieve pressure between the items when the brake bar 46 is applied in its braking operation. This reversing action of the rollers, as just described, thus further assures that there will not be undue pressure on the items I when there is a stoppage of conveying movement of those items, as described.

The rotational drive torque between the collars 27 and the various conveyor rollers can be thus adjusted by the pressure or idler pulleys 34, and that pressure will of course determine what pressure is possible between the retarded product or items I on the conveyor. When that pressure is set so that a 6 pound force is effective between the stopped or retarded items I on the conveyor, for example, then the particular sensor 61 will be actuated for the applying of the brake, as described. Of course the sensor 61 is actually positioned in the closed position relative to its valve 71 every time an item I passes over the sensor roller 67. However, the arrangement is such that there must be a time lapse between the actual depressing of the sensor roller 67 and the actuation of the air spools 96, and that time lapse can be effected by means of an air storage tank 116 which is in fluid-flow connection with the air line 97 by means of an air line 117 connected therewith. That is, once the valve 71 is closed, air pressure will build up in the line 97 and it will take some time for the build-up because of the utilization of the air tank 116. Only when the tank 116 is sufficiently pressurized will there be sufficient pressure in the line 97 to shift the spool 96 to the right and thus actuate the brake, as described above. By this arrangement, there is the sufficient and desired time lag between the actual actuation of the sensor 61 and the operation of the cylinder assembly 54, and thus it requires an actual stoppage of the items I over the sensor roller 67 before the brake will be applied, all as desired.

Also, the signal for the electric solenoid valve 91 can be from a manual switch source or from an automatic switch source which senses the movement or static condition of itens downstream of the conveyor 10. Of course with the solenoid actuated air valve 91 in the FIG. 9 position, there is no air consumed by the system and of course the brake mechanism is not ready for operation except and until the solenoid valve 91 is shifted to the right. Further, the module 81 can be the module furthest downstream on the conveyor 10, and only that single module will be requiring any air at its valve 71, and the subsequent modules upstream on the conveyor 10, such as the module 84, will not be requiring nor receiving any air until the module 81 is actuated. As such, there is a conservation of the air pressure and only the air pressure immediately required for each module is consumed.

Thus the items I are supported on and move downstream along the conveyor, from right to left, as viewed in FIG. 1. The drive for the conveyor rollers is through the driving pulleys or slip clutches 27 which are capable of sufficient frictional drive contact when a radial force presses them against the circumference of the respective rollers. Of course when there is sufficient retardation of rotation of the rollers, such as by stalling or stopping of the items I on the conveyor, then the rollers will terminate rotation while the pulleys or collars 27 will slip or continue to rotate over the rollers. The adjustment of the pulleys 34 will determine the slip relationship mentioned, and thus the force between the items I in a stalled condition on the conveyor can be adjusted or controlled by means of the pulleys 34 which set the tension for the belt 24, and FIG. 1 shows that there is a pulley 34 adjacent each of the slip pulleys or collars 27, and that is a preferred arrangement, and it will also be noticed that only every other one of the rollers on the curve section 18 need be equipped with a slip collar 28, and the intervening roller on section 18 is an idler roller. The brake systems are applied in zones or modules along the length of the conveyor, and the one furthest downstream is the first to be actuated, and it in turn is interconnected with the one adjacent to it and so on in the upstream direction from the first module which is module 81 as described herein. Each brake member 46 is thus actuated only after a time delay of some minimum length of time when it items I are stalled or stopped on the conveyor and over the particular sensor 61 of that particular module or zone. The time delay described herein is operative off the air tanks 116, and this is in the nature of a surge member. It will also be understood by anyone skilled in the art that the air control system described herein could be a different type of fluid system, and a hydraulic system might be utilized with a sensor 61 for actuating a hydraulic valve, in place of the air valve 71, and in turn a hydraulic spool could be actuated for controlling a hydraulic cylinder, in place of the air cylinder 54. Also, it will be seen and understood that the arrangement of the air flow could be reversed in the sense that the valve 71 would only be opened when the items I are stalled thereabove, and the opening of the valve would thus cause a shifting of the spool 96 in the appropriate direction, rather than the closing of the valve 71 as shown in the drawings herein. With that reversed arrangement, the closing of a valve in response to the stalling of the items I would appropriately actuate a spool 96 for actuating the connected cylinder 54, and that would simply require a reversing of the air balancing lines 104 and 103 so that the spool 96 might still shift in the direction to the right for pressurizing the air cylinders 54 in the manner described above and as shown in the drawings.

Also, the drive means 24 is shown as and was described as a urethane belt, but it could also be a cable, chain, or other flexible and endless drive line which is already known to those skilled in the art of endless and flexible drive members.

What is claimed is:

1. A roller type of conveyor comprising a support, a plurality of rollers rotatably mounted on said support for supporting items on said rollers and moving the items along said rollers when said rollers are rotated and each of said rollers having an external cylindrical surface thereon, driving pulleys rotatably mounted on said rollers and each having an inner cylindrical surface slightly larger than said external cylindrical surface and in contact therewith to be rotatable relative to said rollers to slip thereon and also to be in selectable frictional drive contact relative to said rollers for frictionally drivingly rotating said rollers when said pulleys are pressed against said rollers, each of said pulleys having an external cylindrical groove, a powered driver, an endless drive means drivenly connected with said powered driver and extending between and trained in said grooves of said pulleys and being taut between said pulleys for engaging said grooves and positioning said pulleys relative to the longitudinal axes of said rollers, and a tension member in contact with said drive means on the side thereof opposite from the side said drive means is in contact with said pulleys for urging said drive means toward said pulleys and thereby press said pulleys against said rollers to effect the frictional drive between said pulleys and said rollers.

2. The roller type of conveyor as claimed in claim 1, wherein said drive means is a single and continuous belt extending between said pulleys and said powered driver, and a plurality of said tension members spaced along said drive belt to the side of said drive belt opposite from the location of said pulleys, and said tension members being rotatably mounted idler pulleys.

3. The roller type of conveyor as claimed in claim 2, including an adjustable mounting for said tension pulleys and adjustably supporting said tension pulleys for movement of said tension pulleys toward and away from said drive belt to thereby effect selective pressure of said driving pulleys on said rollers and selectively establish the frictional slip drive between said driving pulleys and said rollers.

4. The roller type of conveyor as claimed in claim 1, wherein said rollers are disposed angularly to each other and presenting said rollers in a radial pattern for forming a curved conveyor, and said drive means is disposed to extend along the curve of said curved conveyor in a continuous extent in contact with said pulleys.

5. The roller type of conveyor as claimed in claim 4, wherein there is a plurality of said tension members in the form of idler pulleys spaced along said drive belt, and the rotation axis of said idler pulleys being disposed at an angle relative to the rotation axes of said rollers and being disposed inside the curve of said drive belt to maintain tension in said drive belt.

6. The roller type of conveyor as claimed in claim 1, including a brake member movable disposed adjacent said rollers for contacting said rollers and thereby impeding rotation of said rollers.

7. The roller type of conveyor as claimed in claim 6, wherein said brake member is an elongated member disposed beneath said rollers and is supported for movement along its length, and an inclined plane fixedly disposed beneath said brake member for guiding said brake member up to said rollers when said brake member is moved in the direction of its length.

8. The roller type of conveyor as claimed in claim 7, including a fluid cylinder assembly operatively connected with said brake member for moving the latter into contact with said rollers.

9. The roller type of conveyor as claimed in claim 8, including a sensor operatively connected with said cylinder assembly and extending into the path of said items on said rollers and being actuated by the stalling of said items on said rollers.

10. The roller type of conveyor as claimed in claim 6, wherein there is a plurality of said brake members spaced along the length of the conveyor, and with each of said brake members being operable on different ones of said rollers.

11. The roller type of conveyor as claimed in claim 10, including an actuator operatively connected with each of said brake members for individually moving said brake members into braking contact with said rollers, and a sensor operatively connected with each of said actuators and extending into the path of said items on said rollers and being actuated by the stalling of said items on said rollers.

12. The roller type of conveyor as claimed in claim 6, including a powered member operatively associated with said brake member for the positioning of said brake member into contact with said rollers, a sensor operatively associated with said powered member and being operative in relation to the movement of the items on said conveyor for activating said powered member when the items are stalled on said conveyor, and a time delay mechanism operatively associated with said sensor for delaying the function of said sensor for activating said powered member only after the items have stalled for a minimum length of time.

13. The roller type of conveyor as claimed in claim 12, wherein said powered member is a fluid cylinder assembly connected to said brake member, said time delay is a surge member in fluid-flow communication with said fluid cylinder for effecting the time delay of said mechanism.

14. The roller type of conveyor as claimed in claim 13, wherein said fluid cylinder is an air cylinder, said sensor includes a feeler member in the path of movement of the items on said conveyor, and said sensor includes an air valve in operative position relative to said feeler member to be opened and closed by the position of said feeler member, and said surge member being an air tank in air-flow communication with said valve and said air cylinder for controlling the flow of air to said air cylinder.

15. The roller type of conveyor as claimed in claim 6, wherein said brake member is disposed beneath said rollers and is movably mounted for movement in the downstream direction of movement of the items on said conveyor when moving into braking position, to thereby reverse rotation of said rollers and relieve the force of the items against each other.

* * * * *